Patented Jan. 6, 1953

2,624,662

UNITED STATES PATENT OFFICE 2,624,662

HERBICIDAL COMPOSITIONS

Floyd B. Erickson and Arthur H. Schlesinger, Dayton, Ohio, assignors to Monsanto Chemical Company, St. Louis, Mo., a corporation of Delaware No Drawing. Application October 24, 1951, Serial No. 252,983

11 Claims. (Cl. 71—2.3)

The present invention provides new and highly valuable herbicidal compositions and methods of destroying or preventing plant growth in which such compositions are employed.

We have found that improved, very efficient herbicidal compositions are obtained when there are prepared oil-in-water emulsions of a fluorine-substituted diphenyl sulfone. Fluorine-substituted diphenyl sulfones which are useful for the present purpose are mono-, di- and polyfluorinated sulfones such as 4-fluorodiphenyl sulfone, 4,4'-difluorodiphenyl sulfone, 3,3'-difluorodiphenyl sulfone, 2,4'-difluorodiphenyl sulfone, 2,2',4,4'-difluorodiphenyl sulfone, 2,3-difluorodiphenyl sulfone, 2,3,4-trifluorodiphenyl sulfone, 2,2',4' - trifluorodiphenyl sulfone, 2,2',3,3',4,4'-hexafluorodiphenyl sulfone, 2,2',3,3',4,4',5,5'-octafluorodiphenyl sulfone, decafluorodiphenyl sulfone, etc. There may also be used technical mixtures of fluorinated diphenyl sulfones in which there are present from 1 to 10 fluorine atoms attached to the benzene nucleus.

Herbicidal compositions containing the present fluorine-substituted diphenyl sulfones are readily obtained by first preparing a solution of the sulfone in an organic solvent and then adding the resulting solution to water containing the emulsifying agent to form an emulsion. Because of the very high herbicidal efficiency of the present sulfones, they are present in the herbicidal compositions in only very small concentrations, for example, in concentrations of from 0.1 per cent to 2 per cent by weight of the total weight of the emulsion. Emulsifying agents which may be employed are those customarily used in the art for the preparation of oil-in-water emulsions. Since the present fluorine-substituted diphenyl sulfones are highly stable compounds of little chemical reactivity they are not affected by either ionic or non-ionic emulsifying agents. Examples of emulsifying agents which may be used include alkylbenzenesulfonates, long chain polyalkylene glycols, long chain succinates, etc.

The emulsions may be used to destroy already existing plant growth by direct application to the undesirable plants, e. g., by spraying; or the emulsions may be employed to prevent plant growth by application to media which normally support plant growth. When employed to prevent plant growth, for example in parking areas, highway abutments, railway yards, etc., the emulsions may be applied by spraying only the surface of said media or they may be admixed with said media. Generally, spraying of only the soil surfaces is sufficient to prevent plant growth in areas which are to be kept clear of plants. However the emulsions may be incorporated into customarily employed temporary surfacing materials, e. g., oils, cinders, etc.

The present invention is further illustrated, but not limited, by the following examples:

Example 1

Spray testing of the present herbicidal compositions was conducted as follows:

A cyclohexanone solution of 4,4'-difluorodiphenyl sulfone and an emulsifying agent were added to water, the quantity of solution employed being calculated to give emulsions containing 1.0 per cent and 0.3 per cent by weight, respectively, of the sulfone, based on the weight of the total emulsion. The quantity of emulsifying agent used was 0.2 per cent by weight, based on the weight of the total emulsion. Said emulsifying agent comprised a mixture of a polyalkyleneglycol derivative and an alkylbenzenesulfonate.

Three-week old corn and bean plants were sprayed with the respective emulsions, two plants of each variety being employed. The spraying was continued until droplets formed on and/or fell from the foliage and stems of the sprayed plants, up to 15 ml. of the aqueous emulsion being applied to each plant. The sprayed plants as well as two untreated "blank" specimens of each plant were then allowed to remain under standard conditions of sunlight and watering for a period of one week. At the end of that time the sprayed plants were compared with the untreated plants in order to determine the extent of injury, if any. The following observations were made.

| Percent Concentration of Sulfone | Effect On— | |
|---|---|---|
| | Bean | Corn |
| 0.3 | Moderate injury | Slight injury. |
| 1.0 | Severe injury | Plant dead, leaves dried. |

Example 2

Another method of testing for herbicidal efficiency of a chemical involves noting the effects on seed germination and plant growth which may be evidenced by spraying soil surfaces. This test, commonly known as a "pre-emergence test" was conducted as follows:

Boxes having a 5" x 5" exposed area were partially filled with a layer of soil and 20 seeds were placed thereon and then covered with a ¼" to ½" layer of soil which had been screened to ¼" sieve. Test boxes containing 20 seeds each of cucumber and beet seeds, respectively, were prepared. The surface soil of the seeded boxes was then sprayed, respectively, with 0.3 per cent and 1.0 per cent emulsions of 4,4'-difluorodiphenyl sulfone prepared as in Example 1. The quantity of each emulsion which was applied was calculated to correspond to either 20 lbs. of the sulfone per acre or to 50 lbs./acre. In the present instance 10.8 cc. of the 0.3 per cent emulsion per 25 square inches of surface soil was calculated to correspond to 20 lbs. of the chemical per acre and 9.1 cc. of the 1.0 per cent emulsion to 50 lbs. of the chemical per acre. The sprayed boxes as well as similar seeded but unsprayed test boxes were then maintained at standard conditions of temperature and watering for a period of two weeks. At the end of that time the number of healthy seedlings in each box was counted. Thus the number of non-emerging and damaged seedlings was obtained by difference. This difference is designated as "X." "Per cent phytotoxicity" of the herbicidal composition was determined by the ratio of (X) to the number of healthy seedlings in the control.

There was evidenced from 71 per cent to 100 per cent phytotoxicity to beets at the 50 lbs./acre rate of application and a phytotoxicity of from 21 to 45% at the 20 lb./acre rate. At the 50 lbs. rate a phytotoxicity of from 21 to 45% was observed against cucumbers. In all instances the seedlings were burnt after breaking the surface, giving abnormal stands which withered and died.

For purposes of comparison, like tests were conducted with 4,4'-dichlorodiphenyl sulfone, instead of the fluorine compound. With similarly prepared emulsions of the 4,4'-dichlorodiphenyl sulfone, substantially no phytotoxicity was noted at either the 50 lbs. or 20 lbs./acre rate.

While the fluorine substituted diphenyl sulfones are most advantageously employed as herbicides by incorporating them into an aqueous emulsion as herein described, they may also be employed in other plant destroying methods. Thus they may be incorporated into solid carriers such as clay, talc, pumice and bentonite to give herbicidal compositions which may be applied to living plants or to surfaces which are to be freed from plant growth. The present sulfones may also be mixed with liquid or solid agricultural pesticides, e. g., insecticides and fungicides. While solutions of the sulfones in organic solvents may also be employed for preventing and destroying plant growth, we have found that the emulsions possess an improved tendency to adhere to the treated surfaces and that less of the active ingredient, i. e., the fluorine-substituted diphenyl sulfone, is required to give comparable herbicidal efficiency.

What we claim is:

1. A herbicidal composition comprising an oil-in-water emulsion of a fluorine-substituted diphenyl sulfone, said sulfone being present in said emulsion in a quantity which is toxic to plant life.

2. A herbicidal composition comprising an oil-in-water emulsion of 4,4'-difluorodiphenyl sulfone, said sulfone being present in said emulsion in a quantity which is toxic to plant life.

3. The method of destroying undesirable plants which comprises applying to said plants a toxic quantity of a herbicidal composition comprising as the essential active ingredient a fluorine-substituted diphenyl sulfone.

4. The method of destroying undesirable plants which comprises applying to said plants a toxic quantity of an oil-in-water emulsion of a fluorine-substituted diphenyl sulfone.

5. The method of destroying undesirable plants which comprises applying to said plants a toxic quantity of a herbicidal composition comprising 4,4'-difluorodiphenyl sulfone as the essential active ingredient.

6. The method of destroying undesirable plants which comprises applying to said plants a toxic quantity of an oil-in-water emulsion of 4,4'-difluorodiphenyl sulfone.

7. The method of preventing plant growth which comprises applying to media normally supporting said growth a herbicidal composition comprising a fluorine-substituted diphenyl sulfone as the essential active ingredient.

8. The method of preventing plant growth which comprises applying to media normally supporting said growth an oil-in-water emulsion of a fluorine-substituted diphenyl sulfone.

9. The method of preventing plant growth which comprises applying to soils normally supporting said growth a herbicidal composition comprising a fluorine-substituted diphenyl sulfone as the essential active ingredient.

10. The method of preventing plant growth which comprises applying to soils normally supporting said growth an oil-in-water emulsion of a fluorine-substituted diphenyl sulfone.

11. The method of preventing plant growth which comprises applying to media normally supporting said growth a herbicidal composition comprising 4,4'-difluorodiphenyl sulfone as the essential active ingredient.

FLOYD B. ERICKSON.
ARTHUR H. SCHLESINGER.

No references cited.